United States Patent
Hansen

(10) Patent No.: US 12,210,805 B2
(45) Date of Patent: Jan. 28, 2025

(54) SYSTEMS AND METHODS FOR MODELING WIRELESS POWER TRANSFER SYSTEMS INCLUDING STACKED PLATE RESONATORS

(71) Applicant: TC1 LLC, St. Paul, MN (US)

(72) Inventor: John Freddy Hansen, Pleasanton, CA (US)

(73) Assignee: TC1 LLC, St. Paul, MN (US)

( * ) Notice: Subject to any disclaimer, the term of this patent is extended or adjusted under 35 U.S.C. 154(b) by 974 days.

(21) Appl. No.: 17/184,011

(22) Filed: Feb. 24, 2021

(65) Prior Publication Data

US 2021/0271790 A1    Sep. 2, 2021

Related U.S. Application Data

(60) Provisional application No. 62/980,575, filed on Feb. 24, 2020.

(51) Int. Cl.
*G06F 30/20* (2020.01)
*H02J 50/12* (2016.01)
*G06F 30/27* (2020.01)

(52) U.S. Cl.
CPC .............. *G06F 30/20* (2020.01); *H02J 50/12* (2016.02); *G06F 30/27* (2020.01)

(58) Field of Classification Search
CPC .......... G06F 30/20; G06F 30/27; G06F 30/25; G06F 30/28; G06F 2111/00; G06F 2119/22; H02J 50/12
See application file for complete search history.

(56) References Cited

U.S. PATENT DOCUMENTS 8,875,086 B2    10/2014    Verghese et al.
10,109,413 B2   10/2018    Sullivan
(Continued)

FOREIGN PATENT DOCUMENTS

| CN | 206180709 U | 5/2017 |
| KR | 1925959 B1 | 12/2018 |
| WO | 2017148087 A1 | 9/2017 |

OTHER PUBLICATIONS

C. R. Sullivan, L. Beghou, "Design Methodology for a High-Q Self-Resonant Coil for Medical and Wireless-Power Applications", 2013 IEEE, pp. 1-8 (Year: 2013).*

(Continued)

*Primary Examiner* — Kibrom K Gebresilassie
(74) *Attorney, Agent, or Firm* — Armstrong Teasdale LLP

(57) ABSTRACT

A method for modeling a wireless power transfer system including stacked plate resonators is provided. The method includes generating, using a computing device, a plurality of different sets of design parameters for a wireless power transfer system including a transmit resonator and a receive resonator, each of the transmit resonator and the receive resonator including a magnetic core having a post, and a plurality of alternating dielectric layers and conductive layers stacked around the post. The method further includes selecting, using the computing device, one set of the plurality of generated sets of design parameters, generating, using the computing device, an initial population of wireless power transfer systems based on the selected set, evaluating, using the computing device, each wireless power transfer system in the initial population, and generating, using the computing device, a subsequent population of wireless power transfer systems based on the evaluating.

13 Claims, 5 Drawing Sheets

(56) References Cited

U.S. PATENT DOCUMENTS

| | | | |
|---|---|---|---|
| 10,291,067 B2 | 5/2019 | Petersen et al. | |
| 11,502,543 B2* | 11/2022 | Hui | H02J 50/90 |
| 2015/0073768 A1 | 3/2015 | Kurs et al. | |
| 2015/0180241 A1* | 6/2015 | Petersen | H02J 50/12 |
| | | | 307/104 |
| 2019/0097460 A1 | 3/2019 | Black et al. | |
| 2020/0059119 A1* | 2/2020 | Maniktala | H02J 50/12 |

OTHER PUBLICATIONS

R. Erfani, F. Marefat, A. M. Sodagar, P. Mohseni, "Modeling and Characterization of Capativve Elements with Tissue as Dielectric Material for Wireless Powering of Neural Implants", IEEE, pp. 1093-1099, 2018.*

Stein et al., "Thin Self-Resonant Structures with a High-Q for Wireless Power Transfer", Mar. 4, 2018, Thayer School of Engineering, Dartmouth College, Hanover, NH, 8 pages, accessed online at URL: https://cpb-us-e1.wpmucdn.com/sites.dartmouth.edu/dist/c/87/files/2017/12/Thin_Structure.pdf.

Sullivan Charles R et al, "Design Methodology for a high Q self-resonant coil for medical and wireless-power applications", 2013 IEEE 14th Workshop on Control and Modeling for Power Electronics (Compel) IEEE, Jun. 21, 2013 (Jun. 23, 2013), pp. 1-8, XP032500875, ISSN: 1093-5142, DOI: 10.1109/COMPEL.2013.6626460.

Almoneef Thamer et al, "A 3Dimensional Stacked Metamaterial Arrays for Electromagnetic Energy Harvesting", Progress in Electromagnetics Research, [Online] vol. 146, Jan. 1, 2014 (Jan. 1, 2014), pp. 109-115, XP055805649, DOI: 10.2528/PIER14031603 Retrieved from the Internet: URL:https://www.jpier.org/download/14031603.pdf.

International Search Report, Form PCT/ISA/210, PCT/US2021/019378, date of mailing: May 28, 2021, 4 pages.

Written Opinion of the International Searching Authority, Form PCT/ISA/237, PCT/US2021/019378, date of mailing: May 28, 2021, 9 pages.

Information on Search Strategy, EPO Form P04A42, PCT/US2021/019378, date of mailing: May 28, 2021, 1 page.

* cited by examiner

SYSTEMS AND METHODS FOR MODELING WIRELESS POWER TRANSFER SYSTEMS INCLUDING STACKED PLATE RESONATORS

CROSS-REFERENCE TO RELATED APPLICATIONS

This application claims priority to provisional application Ser. No. 62/980,575, filed Feb. 24, 2020, which is incorporated herein by reference in its entirety.

BACKGROUND OF THE DISCLOSURE a. Field of the Disclosure

The present disclosure relates generally to wireless power transfer systems, and more specifically, relates to modeling wireless power transfer systems including stacked plate resonators.

b. Background

Ventricular assist devices, known as VADs, are implantable blood pumps used for both short-term (i.e., days or months) and long-term (i.e., years or a lifetime) applications where a patient's heart is incapable of providing adequate circulation, commonly referred to as heart failure or congestive heart failure. A patient suffering from heart failure may use a VAD while awaiting a heart transplant or as a long term destination therapy. In another example, a patient may use a VAD while recovering from heart surgery. Thus, a VAD can supplement a weak heart (i.e., partial support) or can effectively replace the natural heart's function.

A wireless power transfer system may be used to supply power to the VAD. The wireless power transfer system generally includes an external transmit resonator and an implantable receive resonator configured to be implanted inside a patient's body. This power transfer system may be referred to as a transcutaneous energy transfer system (TETS).

Wireless power transfer systems, such as TETS, include a number of components working in concert. The number and complexity of the interrelated components makes the process of optimizing the system unwieldy, lengthy, and in some cases impossible, using conventional techniques. This is particularly true in wireless power transfer systems that use stacked plate resonators. In most cases, it is impossible to generate a set of closed equations to perfectly model the stacked plate resonators. For example, resonance frequencies of a stacked plated resonator are dictated based on a number of design parameters and interrelations between those design parameters. Accordingly, there is a need for a method to discover an optimum solution, in a timely manner, for a wireless power transfer system including stacked plate resonators.

SUMMARY OF THE DISCLOSURE

The present disclosure is directed to a method for modeling a wireless power transfer system including stacked plate resonators. The method includes generating, using a computing device, a plurality of different sets of design parameters for a wireless power transfer system, the wireless power transfer system including a transmit resonator and a receive resonator, each of the transmit resonator and the receive resonator including a magnetic core having a post, and a plurality of alternating dielectric layers and conductive layers stacked around the post. The method further includes selecting, using the computing device, one set of the plurality of generated sets of design parameters, generating, using the computing device, an initial population of wireless power transfer systems based on the selected set, evaluating, using the computing device, each wireless power transfer system in the initial population, and generating, using the computing device, a subsequent population of wireless power transfer systems based on the evaluating.

The present disclosure is further directed to a computing device for modeling a wireless power transfer system including stacked plate resonators, the computing device including a memory device, and a processor communicatively coupled to the memory device. The processor is configured to generate a plurality of different sets of design parameters for a wireless power transfer system, the wireless power transfer system including a transmit resonator and a receive resonator, each of the transmit resonator and the receive resonator including a magnetic core having a post, and a plurality of alternating dielectric layers and conductive layers stacked around the post. The processor is further configured to select one set of the plurality of generated sets of design parameters, generate an initial population of wireless power transfer systems based on the selected set, evaluate each wireless power transfer system in the initial population, and generate a subsequent population of wireless power transfer systems based on the evaluating.

The present disclosure is further directed to a non-transitory computer-readable storage media having computer-executable instructions embodied thereon. When executed by a computing device including at least one processor in communication with a memory device, the computer-executable instructions cause the computing device to generate a plurality of different sets of design parameters for a wireless power transfer system, the wireless power transfer system including a transmit resonator and a receive resonator, each of the transmit resonator and the receive resonator including a magnetic core having a post, and a plurality of alternating dielectric layers and conductive layers stacked around the post. The computer-executable instructions further cause the computing device to select one set of the plurality of generated sets of design parameters, generate an initial population of wireless power transfer systems based on the selected set, evaluate each wireless power transfer system in the initial population, and generate a subsequent population of wireless power transfer systems based on the evaluating.

DETAILED DESCRIPTION OF THE DISCLOSURE

The present disclosure is directed to systems and methods for modeling a wireless power transfer system including stacked plate resonators. A method includes generating, using a computing device, a plurality of different sets of design parameters for a wireless power transfer system, the wireless power transfer system including a transmit resonator and a receive resonator, each of the transmit resonator and the receive resonator including a magnetic core having a post, and a plurality of alternating dielectric layers and conductive layers stacked around the post. The method further includes selecting, using the computing device, one set of the plurality of generated sets of design parameters, generating, using the computing device, an initial population of wireless power transfer systems based on the selected set, evaluating, using the computing device, each wireless power transfer system in the initial population, and generating, using the computing device, a subsequent population of wireless power transfer systems based on the evaluating.

Figure 1:
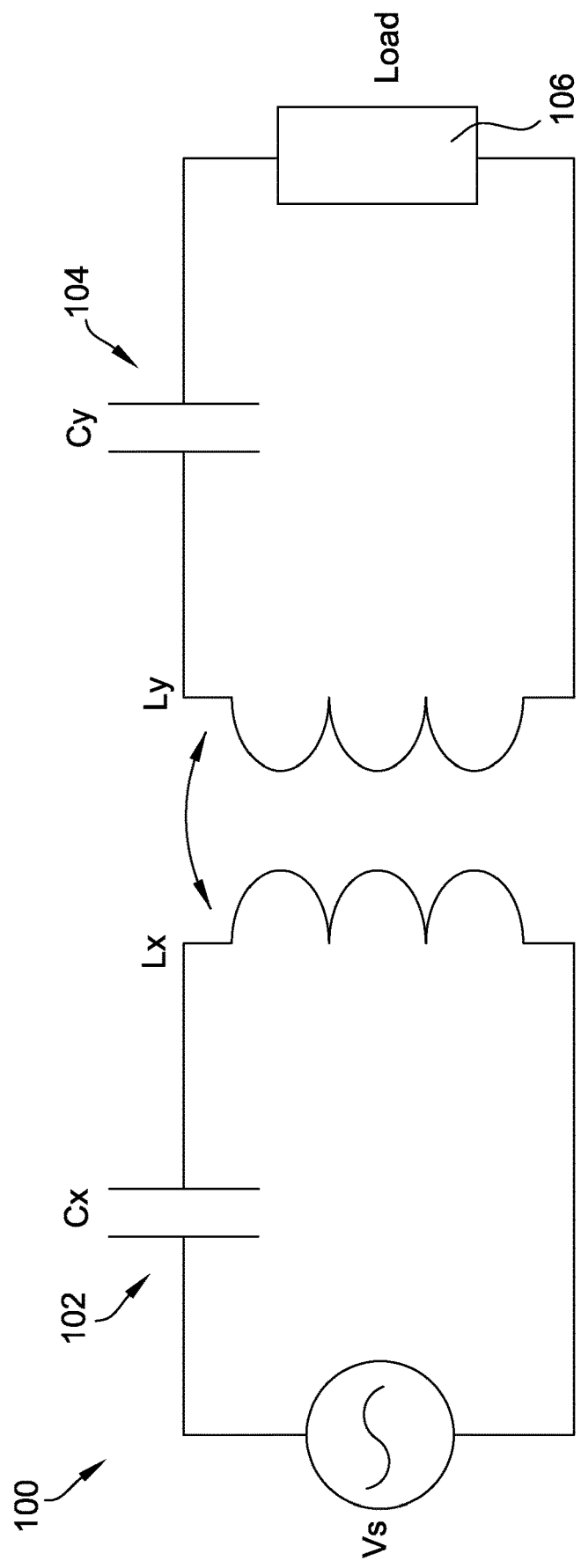
FIG. 1 is a simplified electrical circuit diagram of one embodiment of a wireless power transfer system.

Referring now to the drawings, FIG. 1 is a simplified circuit of an exemplary wireless power transfer system 100. The system 100 includes an external transmit resonator 102 and an implantable receive resonator 104. In the system shown in FIG. 1, a power source Vs is electrically connected with the transmit resonator 102, providing power to the transmit resonator 102. The receive resonator 104 is connected to a load 106 (e.g., an implantable medical device). The receive resonator 104 and the load 106 may be electrically connected with a switching or rectifying device (not shown).

In the exemplary embodiment, the transmit resonator 102 includes a coil Lx connected to the power source Vs by a capacitor Cx. Further, the receive resonator 104 includes a coil Ly connected to the load 106 by a capacitor Cy. Inductors Lx and Ly are coupled by a coupling coefficient k. $M_{xy}$ is the mutual inductance between the two coils. The mutual inductance, $M_{xy}$, is related to the coupling coefficient k as shown in the below Equation (1).

$$M_{xy}=k\sqrt{L_x \cdot L_y} \quad (1)$$

In operation, the transmit resonator 102 transmits wireless power received from the power source Vs. The receive resonator 104 receives the power wirelessly transmitted by the transmit resonator 102, and transmits the received power to the load 106.

Figure 2:
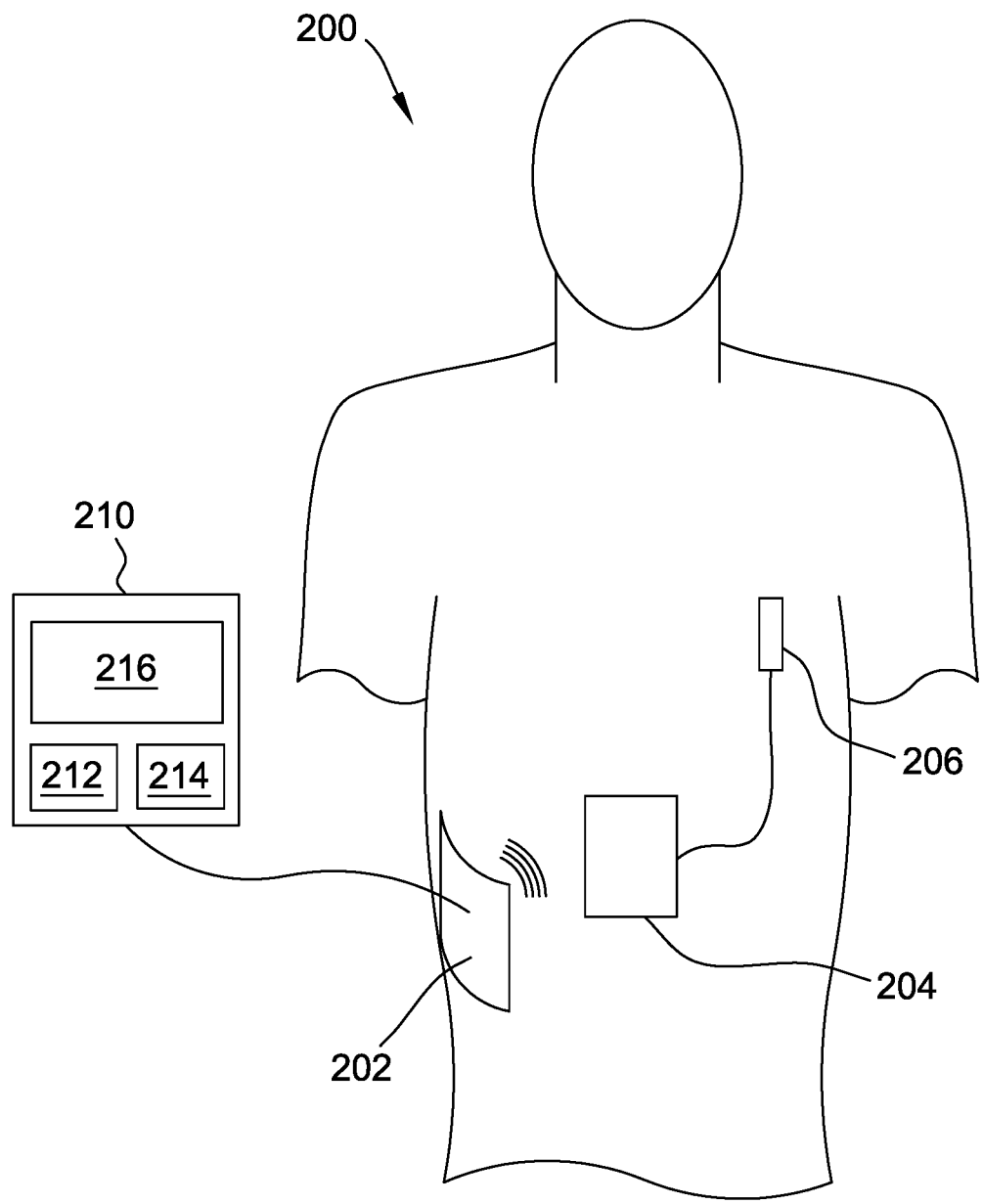
FIG. 2 is an illustration of the wireless power transfer system of FIG. 1 being used to supply power to a ventricular assist device (VAD).

FIG. 2 illustrates one embodiment of a patient 200 using an external coil 202 (such as the transmit resonator 102 shown in FIG. 1) to wirelessly transmit power to an implanted coil 204 (such as the receive resonator shown in FIG. 1). The implanted coil 204 uses the received power to power an implanted device 206. For example, the implanted device 206 may include a pacemaker or heart pump (e.g., a left ventricular assist device (LVAD)). In some embodiments, the implanted coil 204 and/or the implanted device 206 may include or be coupled to a battery.

In one embodiment, the external coil 202 is communicatively coupled to a computing device 210, for example, via wired or wireless connection, such that the external coil 202 may receive signals from and transmit signals to the computing device 210. In some embodiments, the computing device 210 is a power source for the external coil 202. In other embodiments, the external coil 202 is coupled to an alternative power supply (not shown). The computing device 210 includes a processor 212 in communication with a memory 214. In some embodiments, executable instructions are stored in the memory 214.

The computing device 210 further includes a user interface (UI) 216. The UI 216 presents information to a user (e.g., the patient 200). For example, the UI 216 may include a display adapter (not shown) that may be coupled to a display device, such as a cathode ray tube (CRT), a liquid crystal display (LCD), an organic LED (OLED) display, and/or an "electronic ink" display. In some embodiments, the UI 216 includes one or more display devices. Further, in some embodiments, presentation interface may not generate visual content, but may be limited to generating audible and/or computer-generated spoken-word content. In the example embodiment, the UI 216 displays one or more representations designed to aid the patient 200 in placing the external coil 202 such that the coupling between the external coil 202 and the implanted coil 204 is optimal. In some embodiments, the computing device 210 may be a wearable device. For example, in one embodiment, the computing device 210 is a wrist watch, and the UI 216 is displayed on the wrist watch.

Figures 3A, 3B:
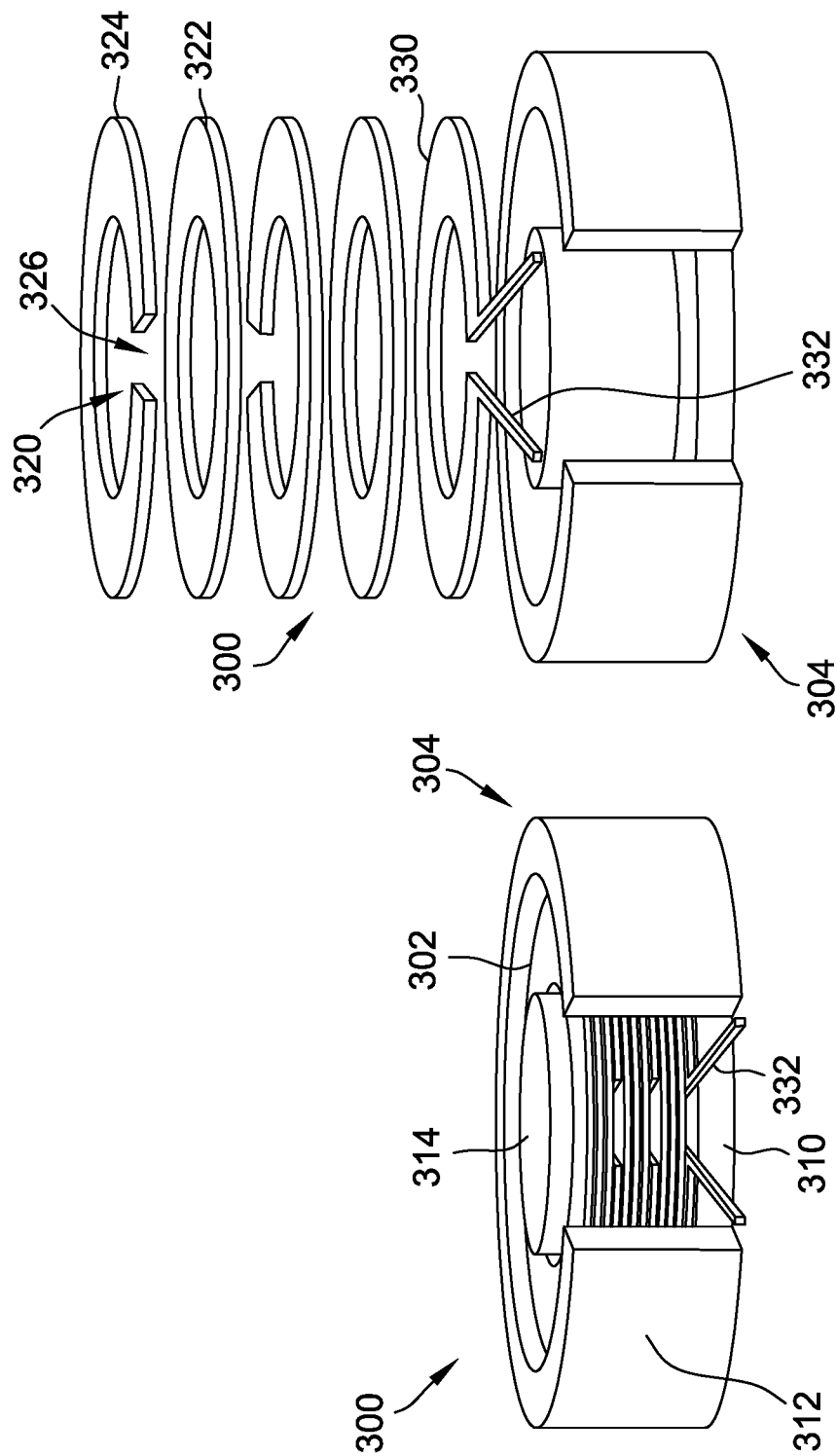
FIG. 3A is a schematic diagram of one embodiment of a stacked plate resonator that may be used with the system shown in FIG. 2.
FIG. 3B is an exploded view of the stacked plate resonator shown in FIG. 3A.

FIG. 3A is a schematic diagram of one embodiment of a stacked plate resonator 300 that may be used to implement the system 100 shown in FIG. 1. For example, the stacked plate resonator 300 may be used to implement external transmit resonator 102, the implantable receive resonator 104, the external coil 202, and/or the implanted coil 204. FIG. 3B is an exploded view of the stacked plate resonator 300. Similar stacked plate resonators are shown and described in "Thin Self-Resonant Structures with a High-Q for Wireless Power Transfer" by Stein et al., Mar. 4, 2018, Thayer School of Engineering, Dartmouth College, Hanover, NH.

As shown in FIGS. 3A and 3B, the stacked plate resonator 300 includes a plurality of stacked plates 302 arranged on a magnetic core 304. For clarity, in FIGS. 3A and 3B, the thickness of each stacked plate 302 is exaggerated. For example, in some embodiments, the thickness of each stacked plate 302 may be in a range from 10 micrometers (μm) to 200 μm. For example, more particularly, the thickness may in a range from 20-70 μm. Further, in FIGS. 3A and 3B, the stacked plate resonator 300 is shown as including five stacked plates 302. However, those of skill in the art will appreciate that the stacked plate resonator 300 may include any suitable number of stacked plates 302.

The magnetic core 304 includes a base 310, a perimeter wall 312, and a post 314. In some embodiments, the perimeter wall 312 is omitted. As shown in FIGS. 3A and 3B, each stacked plate 302 includes an aperture 320 sized to receive the post 314, such that each stacked plate 302 generally surrounds the post 314 and is positioned between the post 314 and the perimeter wall 312 of the magnetic core 304. A height from the base 310 to the top of the perimeter wall 312 may be the same as, or different from, a height of the post 314. The magnetic core 304 may be formed of a ferrite material, such as nickel-based or manganese-based ferrites. Nickel-based ferrites generally have lower electrical conductivity and reduced losses, while manganese-based ferrites have a higher magnetic permeability (while still having acceptable losses), facilitating containing magnetic field lines, and reducing fringing fields entering nearby conductors (e.g., a titanium enclosure or copper in a nearby PCB) to prevent losses. In other embodiments, other types of ferrite materials may be used. For example, in some embodiments, a magnesium-based ferrite (e.g., MgCuZn, which may outperform nickel-based and manganese-based ferrites in a frequency range around 1 Megahertz (MHz)) may be used.

The stacked plates 302 include a plurality of alternating dielectric layers 322 and conductive layers 324 that form a stack. In the embodiment shown in FIGS. 3A and 3B, each dielectric layer 322 is an annular plate that is generally o-shaped, and extends between an inner diameter and an outer diameter. Each conductive layer 324 defines a notch 326, such that each conductive layer is generally c-shaped and extends between an inner diameter and an outer diameter. Each conductive layer 324 extends circumferentially through an angle (referred to herein as an "angular span") that is less than 360° to define the notch 326. The dielectric layers 322 may be formed of, for example, ceramic, plastic, glass, and/or mica.

Further, each conductive layer 324 has an opposite orientation relative to the next conductive layer 324, such that the notches 326 in consecutive conductive layers 324 are oriented at 180° relative to each other. The opposite orientations result in consecutive conductive layers 324 forming two capacitors. Alternatively, other angular orientations may be used.

In one embodiment, one conductive layer 324 is a base conductive layer 330 that includes two terminals 332. The terminals 332 enable the stacked plate resonator 300 to be coupled to, for example, a power source (when functioning as a transmit resonator) or the load 106 (when functioning as a receive resonator). Further, in some embodiments, the stacked plates 302 that form the top and bottom of the stack are conductive layers 324, not dielectric layers 322. Alternatively, a dielectric layer 322 may be positioned on the top and/or bottom of the stack.

In operation, when power is supplied to a stacked plate resonator 300 operating as a transmit resonator, current flows through the capacitors formed by the conductive layers 324, creating an inductive current loop. Specifically, when supplied power, a first stacked plate resonator 300 functions as a parallel LC resonator, and is capable of wirelessly transmitting power to a second stacked plate resonator 300 (which similarly functions as a parallel LC resonator), provided the resonance frequencies of the first and second stacked plate resonators 300 overlap.

The resonance frequency of the stacked plate resonator 300 may be, for example, approximately 6.78 Megahertz (MHz). Specifically, the resonance frequency of the stacked plate resonator 300 is inversely proportional to the square root of the product of inductance and capacitance in the stacked plate resonator 300. The inductance and capacitance are determined based on the design of the stacked plate resonator 300. Accordingly, by modifying the design of the stacked plate resonator 300, the resonance frequency may be modified.

As will be appreciated by those of skill in the art, it is generally desirable to increase/improve/optimize the amount of wireless power transmitted from a transmit resonator to a receive resonator. Accordingly, the systems and methods described herein use a computing device to model and simulate operation of a wireless power transfer system including stacked plate resonators to facilitate improving wireless power transfer in such a system. To model and simulate operation of the wireless power transfer system, the computing device may leverage artificial intelligence (AI). AI may include, for example, search and optimization approaches, logic, probabilistic methods (fuzzy logic), statistical learning, genetic algorithms, heuristic searching, and neural networks.

Figure 4:
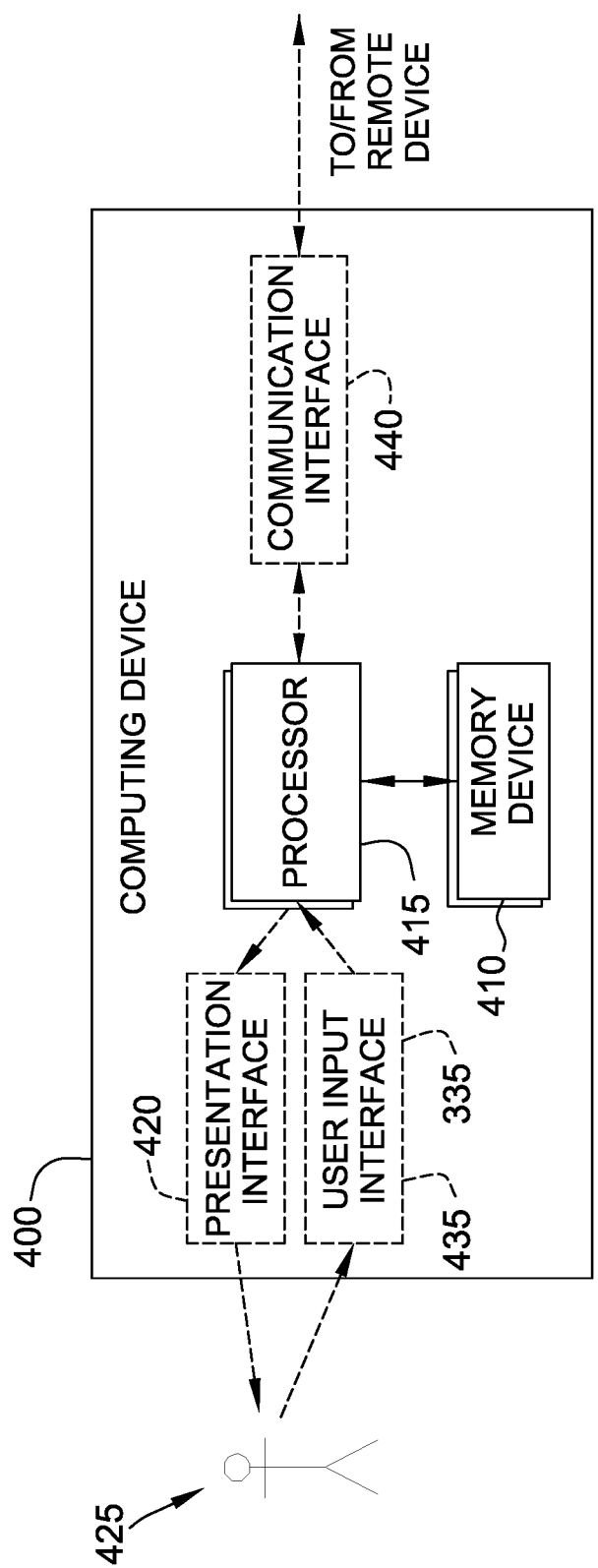
FIG. 4 is a block diagram of one embodiment of a computing device that may be used to implement the systems and methods described herein.

FIG. 4 is a block diagram of a computing device 400 that may be used to implement the systems and methods described herein. The computing device 400 includes at least one memory device 410 and a processor 415 that is coupled to the memory device 410 for executing instructions. In some embodiments, executable instructions are stored in the memory device 410. In this embodiment, the computing device 400 performs one or more operations described herein by programming the processor 415. For example, the processor 415 may be programmed by encoding an operation as one or more executable instructions and by providing the executable instructions in the memory device 410.

The processor 415 may include one or more processing units (e.g., in a multi-core configuration). Further, the processor 415 may be implemented using one or more heterogeneous processor systems in which a main processor is present with secondary processors on a single chip. In another illustrative example, the processor 415 may be a symmetric multi-processor system containing multiple processors of the same type. Further, the processor 415 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), graphics processing units (GPU), and any other circuit capable of executing the functions described herein.

In this embodiment, the memory device 410 is one or more devices that enable information such as executable instructions and/or other data to be stored and retrieved. The memory device 410 may include one or more computer readable media, such as, without limitation, dynamic random access memory (DRAM), static random access memory (SRAM), a solid state disk, and/or a hard disk. The memory device 410 may be configured to store, without limitation, application source code, application object code, source code portions of interest, object code portions of interest, configuration data, execution events and/or any other type of data.

In this embodiment, the computing device 400 includes a presentation interface 420 that is coupled to the processor 415. The presentation interface 420 presents information to a user 425. For example, the presentation interface 420 may include a display adapter (not shown) that may be coupled to a display device, such as a cathode ray tube, a liquid crystal display (LCD), an organic LED (OLED) display, and/or an "electronic ink" display. In some embodiments, the presentation interface 420 includes one or more display devices. Input signals and/or filtered signals processed using the embodiments described herein may be displayed on the presentation interface 420.

In this embodiment, the computing device 400 includes a user input interface 435. The user input interface 435 is coupled to the processor 415 and receives input from the user 425. The user input interface 435 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of the presentation interface 420 and the user input interface 435.

The computing device 400, in this embodiment, includes a communication interface 440 coupled to the processor 415. The communication interface 440 communicates with one or more remote devices. To communicate with remote devices, the communication interface 440 may include, for example, a wired network adapter, a wireless network adapter, and/or a mobile telecommunications adapter.

Figure 5:
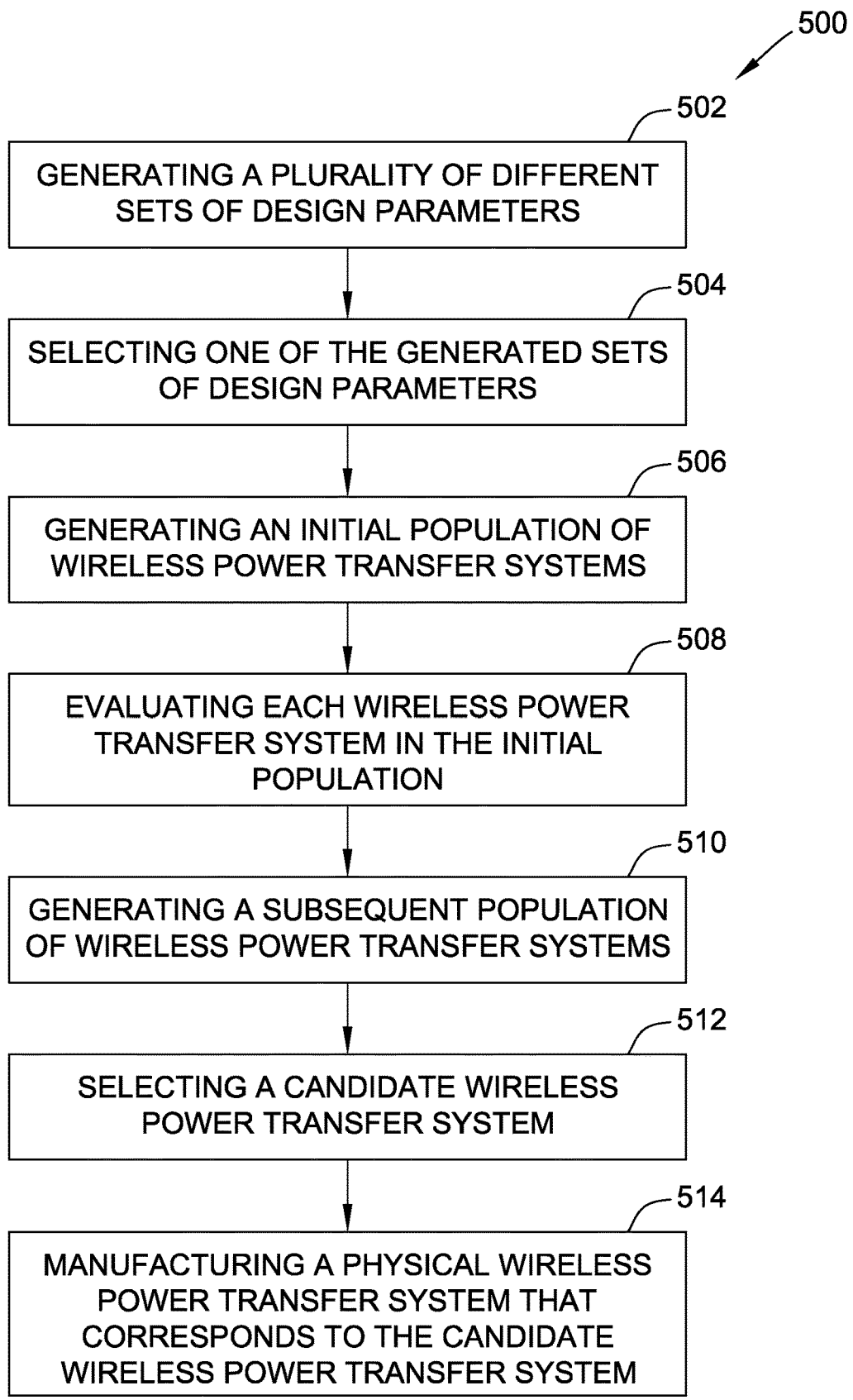
FIG. 5 is a flow chart of one embodiment of a method for modeling a wireless power transfer system including stacked plate resonators.

FIG. 5 is a flow chart of one embodiment of a method 500 for modeling a wireless power transfer system including stacked plate resonators. The method 500 makes use of a genetic algorithm, or a search heuristic, with various evolutions. An evolutionary optimization algorithm, such as the genetic algorithm described herein, is a technique to find an optimum solution to a complicated problem that is difficult and time consuming to analyze directly. For circuit designs, such as a stacked plate resonator circuit design, it may be used to optimize a problem for several parameters at once even when the circuit is relatively complicated with interrelations between different components.

One advantage of an optimization algorithm is that it may be used to solve a complicated system without having to establish closed form equations to define the optimization. Therefore, there does not need to be a complete or comprehensive understanding of the interactions within the modeled system in order to achieve optimization.

As described above, a wireless power transfer system may include a first stacked plate resonator that functions as a transmit resonator, and a second stacked plate resonator that functions as a receive resonator. The method 500 described herein facilitates generating an optimization equation for such a wireless power transfer system. For this embodiment, the circuit structure is fixed, and design parameters are varied to facilitate optimization.

The method includes generating 502, using the computing device 400, a plurality different sets of design parameters for the wireless power transfer system. Referring back to FIGS. 3A and 3B, the stacked plate resonators 300 in the wireless power transfer system are defined by a plurality of design parameters. Design parameters used in the embodiments described herein may include, for example: a thickness of the dielectric layers 322 in at least one of the transmit resonator and the receive resonator, a dielectric constant of the dielectric layers 322 in at least one of the transmit resonator and the receive resonator, an inner diameter of the dielectric layers 322 in at least one of the transmit resonator and the receive resonator, an outer diameter of the dielectric layers 322 in at least one of the transmit resonator and the receive resonator, a number of dielectric layers 322 in at least one of the transmit resonator and the receive resonator, a thickness of the conductive layers 324 in at least one of the transmit resonator and the receive resonator, an angular span of the conductive layers 324 in at least one of the transmit resonator and the receive resonator, a number of conductive layers 324 in at least one of the transmit resonator and the receive resonator, an inner diameter of the conductive layers 324 in at least one of the transmit resonator and the receive resonator, and an outer diameter of the conductive layers 324 in at least one of the transmit resonator and the receive resonator. Those of skill in the art will appreciate that additional and/or alternative design parameters may be used.

For example, design parameters may relate to non-linear electronic components that may be included in the wireless power transfer systems. For example, the design parameters may relate to field effect transistors (FETs) used for active rectification. FETs do have regular ohmic conduction losses (i.e., proportional to current squared), but also have significant switching losses and diode conduction losses (linearly proportional to current). Accordingly, the design parameters may include selecting FETs from a library of possible FETs (and include these in the "mating" described below). Further, the design parameters may include different switching strategies (e.g., zero current switching). In another example, the design parameters may include selecting diodes (e.g., for passive rectification) from a library of diodes. In yet another example, the design parameters may relate to the generation of the input voltage (e.g., the characteristics of the duty cycle used to generate a pulse-width modulated voltage).

Each generated 502 set of design parameters includes randomly chosen values for one or more design parameters (e.g., one or more of the design parameters listed above). The sets may be generated 502 automatically by the computing device 400. The values may be randomly chosen, by the computing device 400, within a predetermined range. For example, values for the thickness of the dielectric layers 322 and the thickness of the conductive layers 324 may be randomly chosen within a range of 0-200 µm. In some embodiments, the predetermined range may be specified by a user (e.g., via a user input to computing device 400).

The method 500 further includes selecting 504 one set of the generated 502 sets. The one set may be selected 504 automatically by the computing device 400 based on a calculated efficiency for the set. That is, for each generated 502 set, the computing device 400 may simulate operation of a wireless power system that includes the design parameters for that set, and calculate a wireless power transfer efficiency for that set based on the simulated operation. Then, the computing device selects 504 the set having the highest calculated efficiency.

The method 500 further includes generating 506 an initial population of wireless power transfer systems based on the selected 504 set. The wireless power transfer systems are not actual, physical systems, but digital representations (e.g., stored in the memory device 410) of the wireless power transfer systems that are used for modeling and simulation purposes, as described herein. In one embodiment, the initial population of wireless power transfer systems is generated 506 by randomly varying, using the computing device, values for one or more of the design parameters in the selected 504 set. Again, the values may be varied within a predetermined range. The initial population of wireless power transfer system may be relatively large (e.g., including at least 10,000 different wireless power transfer systems).

The method 500 further includes evaluating 508, using the computing device 400, each wireless power transfer system in the initial population. On one embodiment, the evaluating 508 includes calculating a score for each wireless power transfer system. For example, operation of each wireless power transfer system may be simulated, and a total score may be calculated, from the simulation, based on at least one of efficiency of wireless power transfer, voltage gain, input current, power lost at the receive resonator, voltage at the receive resonator, etc. That is, the total score may be calculated by summing a plurality of sub-scores, each sub-score associated with one of the different components (e.g., efficiency of wireless power transfer, voltage gain, etc.). Further, these different components may be weighted differently when calculating the score, such that different sub-scores have different weightings. For example, efficiency of wireless power transfer may be weighted greater than voltage at the receive resonator. Those of skill in the art will appreciate that any suitable scoring methodology may be used to assess the wireless power transfer systems in the initial population.

Subsequently, the method 500 includes generating 510, using the computing device 400, a subsequent population of wireless power transfer systems based on the evaluation 508 of the wireless power transfer systems from the initial population. For example, the subsequent population may be generated 510 by randomly varying design parameter values for all wireless power transfer systems in the initial population that are assigned a score above a predetermined threshold (e.g., indicating that the wireless power transfer systems perform relatively well). Alternatively, the subsequent population may be generated 510 by randomly varying design parameter values for a predetermined number of wireless power transfer systems based on their score (e.g., the wireless power transfer system having the best score, the ten wireless power transfer systems having the best scores, the fifty wireless power transfer systems having the best scores, etc.). In yet another embodiment, the subsequent population may be generated 510 by randomly "mating" wireless power transfer systems to generate "child" wireless power transfer systems (e.g., by randomly swapping design parameter values between different wireless power transfer systems both having favorable scores). In another embodiment, the subsequent population may be generated 510 using wireless power transfer systems from the initial population that are relatively diverse from one another, to avoid the algorithm converging to a local optimum.

In yet another embodiment, the subsequent population may be generated 510 by mating and/or varying parameters of wireless power transfer systems based on their sub-scores. For example, one wireless power transfer system may have a relatively low voltage gain sub-score, but a relatively high power transfer efficiency sub-score. This system may have only a moderate total score (due to the low voltage gain sub-score). However, given the relatively high power transfer efficiency sub-score, it may still be beneficial to use this wireless power transfer system to generate 510 the subsequent population.

Once the subsequent population is generated 510, a candidate wireless power transfer system may be selected 512, using the computing device 400, from the subsequent population (e.g., based on efficiency of wireless power transfer, voltage gain, input current, power lost at the receive resonator, voltage at the receive resonator, etc.). Due to the operation of the method 500, there is a high probability that candidate wireless power transfer system will have desirable operating characteristics. Accordingly, a physical wireless power transfer system may be manufactured 514 based on the candidate wireless power transfer system. Manufacturing 514 the physical wireless power transfer system may include fabricating a new wireless power transfer system, or modifying a previously existing wireless power transfer system.

Alternatively, once the subsequent population is generated 510, the wireless power transfer systems in the subsequent population may be evaluated (similar to the evaluation 508) to generate a further subsequent population (similar to the generation 510). Those of skill in the art will appreciate that these steps may be iterated any number of times before selecting 512 a candidate wireless power transfer system for manufacturing 514. In general, the more iterations performed of evaluating and generating subsequent populations, the more desirable the characteristics of the candidate wireless power transfer system (because the algorithm generally generates better and better populations with more and more iterations). In some embodiments, the candidate wireless power transfer system includes a transit resonator and a receive resonator with partially overlapping, but distinct resonance frequency ranges.

In various embodiments, the optimization algorithm makes use of any of the techniques described above in any combination.

The embodiments described herein are directed to systems and methods for modeling a wireless power transfer system including stacked plate resonators. A method includes generating, using a computing device, a plurality of different sets of design parameters for a wireless power transfer system, the wireless power transfer system including a transmit resonator and a receive resonator, each of the transmit resonator and the receive resonator including a magnetic core having a post, and a plurality of alternating dielectric layers and conductive layers stacked around the post. The method further includes selecting, using the computing device, one set of the plurality of generated sets of design parameters, generating, using the computing device, an initial population of wireless power transfer systems based on the selected set, evaluating, using the computing device, each wireless power transfer system in the initial population, and generating, using the computing device, a subsequent population of wireless power transfer systems based on the evaluating.

Although the embodiments and examples disclosed herein have been described with reference to particular embodiments, it is to be understood that these embodiments and examples are merely illustrative of the principles and applications of the present disclosure. It is therefore to be understood that numerous modifications can be made to the illustrative embodiments and examples and that other arrangements can be devised without departing from the spirit and scope of the present disclosure as defined by the claims. Thus, it is intended that the present application cover the modifications and variations of these embodiments and their equivalents.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for modeling a wireless power transfer system including stacked plate resonators, the method comprising:
   generating, using a computing device, a plurality of different sets of design parameters for a wireless power transfer system, the wireless power transfer system including a transmit resonator and a receive resonator, each of the transmit resonator and the receive resonator including a magnetic core having a post, and a plurality of alternating dielectric layers and conductive layers stacked around the post, wherein the design parameters include thicknesses, inner diameters, and outer diameters of the alternating dielectric layers in at least one of the transmit resonator and the receive resonator;
   selecting, using the computing device, one set of the plurality of generated sets of design parameters;
   generating, using the computing device, an initial population of wireless power transfer systems based on the selected set by randomly varying values of the thicknesses, inner diameters, and outer diameters of the alternating dielectric layers;

evaluating, using the computing device, each wireless power transfer system in the initial population;

generating, using the computing device, a subsequent population of wireless power transfer systems based on the evaluating;

selecting, using the computing device, a candidate wireless power transfer system from the subsequent population of wireless power transfer systems; and manufacturing a physical wireless power transfer system that corresponds to the candidate wireless power transfer system.

2. The method of claim 1, wherein manufacturing a physical wireless power transfer system comprises fabricating a new wireless power transfer system.

3. The method of claim 1, wherein manufacturing a physical wireless power transfer system comprises modifying an existing wireless power transfer system.

4. The method of claim 1, wherein the design parameters further include at least one of a dielectric constant of the dielectric layers in at least one of the transmit resonator and the receive resonator, a number of dielectric layers in at least one of the transmit resonator and the receive resonator, a thickness of the conductive layers in at least one of the transmit resonator and the receive resonator, an angular span of the conductive layers in at least one of the transmit resonator and the receive resonator, a number of conductive layers in at least one of the transmit resonator and the receive resonator, an inner diameter of the conductive layers in at least one of the transmit resonator and the receive resonator, and an outer diameter of the conductive layers in at least one of the transmit resonator and the receive resonator.

5. The method of claim 1, wherein evaluating each wireless power transfer system in the initial population comprises calculating a score for each wireless power transfer system in the initial population based at least in part on an expected power transfer efficiency for that wireless power transfer system.

6. The method of claim 1, wherein generating a subsequent population comprises mating multiple wireless power transfer systems in the initial population either randomly, or based on the evaluating.

7. The method of claim 1, wherein the design parameters further include i) field effect transistors selected for use and ii) diodes selected for use, and wherein generating the plurality of different sets of design parameters further comprises i) randomly selecting the field effect transistors from a library of possible field effect transistors and ii) randomly selecting the diodes from a library of possible diodes.

8. A computing device for modeling a wireless power transfer system including stacked plate resonators, the computing device comprising:

a memory device; and a processor communicatively coupled to the memory device, the processor configured to:

generate a plurality of different sets of design parameters for a wireless power transfer system, the wireless power transfer system including a transmit resonator and a receive resonator, each of the transmit resonator and the receive resonator including a magnetic core having a post, and a plurality of alternating dielectric layers and conductive layers stacked around the post, wherein the design parameters include thicknesses, inner diameters, and outer diameters of the alternating dielectric layers in at least one of the transmit resonator and the receive resonator;

select one set of the plurality of generated sets of design parameters;

generate an initial population of wireless power transfer systems based on the selected set by randomly varying values of the thicknesses, inner diameters, and outer diameters of the alternating dielectric layers;

evaluate each wireless power transfer system in the initial population;

generate a subsequent population of wireless power transfer systems based on the evaluating;

select a candidate wireless power transfer system from the subsequent population of wireless power transfer system; and output the selected candidate wireless power transfer system to facilitate manufacturing a physical wireless power transfer system that corresponds to the candidate wireless power transfer system.

9. The computing device of claim 8, wherein the design parameters further include at least one of a dielectric constant of the dielectric layers in at least one of the transmit resonator and the receive resonator, a number of dielectric layers in at least one of the transmit resonator and the receive resonator, a thickness of the conductive layers in at least one of the transmit resonator and the receive resonator, an angular span of the conductive layers in at least one of the transmit resonator and the receive resonator, a number of conductive layers in at least one of the transmit resonator and the receive resonator, an inner diameter of the conductive layers in at least one of the transmit resonator and the receive resonator, and an outer diameter of the conductive layers in at least one of the transmit resonator and the receive resonator.

10. The computing device of claim 8, wherein to evaluate each wireless power transfer system in the initial population, the processor is configured to calculate a score for each wireless power transfer system in the initial population based at least in part on an expected power transfer efficiency for that wireless power transfer system.

11. The computing device of claim 8, wherein to generate a subsequent population, the processor is configured to mate multiple wireless power transfer systems in the initial population either randomly, or based on the evaluating.

12. A non-transitory computer-readable storage media having computer-executable instructions embodied thereon, wherein when executed by a computing device comprising at least one processor in communication with a memory device, the computer-executable instructions cause the computing device to:

generate a plurality of different sets of design parameters for a wireless power transfer system, the wireless power transfer system including a transmit resonator and a receive resonator, each of the transmit resonator and the receive resonator including a magnetic core having a post, and a plurality of alternating dielectric layers and conductive layers stacked around the post, wherein the design parameters include thicknesses, inner diameters, and outer diameters of the alternating dielectric layers in at least one of the transmit resonator and the receive resonator;

select one set of the plurality of generated sets of design parameters;

generate an initial population of wireless power transfer systems based on the selected set by randomly varying values of the thicknesses, inner diameters, and outer diameters of the alternating dielectric layers;

evaluate each wireless power transfer system in the initial population;

generate a subsequent population of wireless power transfer systems based on the evaluating;

select a candidate wireless power transfer system from the subsequent population of wireless power transfer system; and output the selected candidate wireless power transfer system to facilitate manufacturing a physical wireless power transfer system that corresponds to the candidate wireless power transfer system.

13. The non-transitory computer-readable storage media of claim 12, wherein the design parameters further include at least one of a dielectric constant of the dielectric layers in at least one of the transmit resonator and the receive resonator, a number of dielectric layers in at least one of the transmit resonator and the receive resonator, a thickness of the conductive layers in at least one of the transmit resonator and the receive resonator, an angular span of the conductive layers in at least one of the transmit resonator and the receive resonator, a number of conductive layers in at least one of the transmit resonator and the receive resonator, an inner diameter of the conductive layers in at least one of the transmit resonator and the receive resonator, and an outer diameter of the conductive layers in at least one of the transmit resonator and the receive resonator.

* * * * *